United States Patent [19]

Davis et al.

[11] Patent Number: 5,468,550

[45] Date of Patent: Nov. 21, 1995

[54] EPDM ROOFING MEMBRANE WITH IMPROVED BURN RESISTIVITY

[75] Inventors: James A. Davis, Indianapolis; Edward G. Kane, Carmel; Brian S. Alexander, Sheridan, all of Ind.; William F. Barham, Hope, Ark.

[73] Assignee: Bridgestone/Firestone, Inc., Akron, Ohio

[21] Appl. No.: 254,841

[22] Filed: Jun. 6, 1994

[51] Int. Cl.[6] ........................................... B32B 9/00
[52] U.S. Cl. .......................... 428/327; 428/52; 428/141; 428/143; 428/192; 428/281; 428/402; 428/401; 428/483; 428/484; 428/516; 428/519; 428/913; 524/71; 524/78; 524/413; 524/426; 525/88; 525/95; 525/97; 525/211
[58] Field of Search ............................ 428/143, 281, 428/402, 516, 484, 519, 483, 141, 327, 57, 461, 192, 913; 525/88, 211, 97, 95; 524/525, 426, 413, 71, 78, 572

[56] References Cited

U.S. PATENT DOCUMENTS

| | | | |
|---|---|---|---|
| 3,280,082 | 10/1966 | Natta et al. | 260/80.7 |
| 3,650,874 | 3/1972 | Job et al. | 161/217 |
| 3,660,530 | 5/1972 | Hoblit et al. | 260/876 |
| 3,801,531 | 4/1974 | Berejka et al. | 260/33.4 PQ |
| 3,867,247 | 2/1975 | O'Farrell et al. | 161/88 |
| 3,887,530 | 6/1975 | O'Farrell et al. | 260/79.3 R |
| 3,919,358 | 11/1975 | Batiuk et al. | 260/897 A |
| 3,941,859 | 3/1976 | Batiuk et al. | 260/897 B |
| 4,036,912 | 7/1977 | Stricharczuk | 260/897 A |
| 4,130,535 | 12/1978 | Coran et al. | 260/33.6 AQ |
| 4,210,579 | 7/1980 | Grigo et al. | 525/88 |
| 4,212,787 | 7/1980 | Matsuda et al. | 260/33.6 AQ |
| 4,220,579 | 9/1980 | Rinehart | 260/33.6 AQ |
| 4,229,504 | 10/1980 | Brachman | 428/461 |
| 4,247,661 | 1/1981 | Herman et al. | 525/88 |
| 4,263,186 | 4/1981 | Blüemel | 260/23 H |
| 4,355,139 | 10/1982 | Coran et al. | 525/133 |
| 4,435,466 | 3/1984 | Kuhnel et al. | 428/215 |
| 4,438,228 | 3/1984 | Schenck | 524/109 |
| 4,480,012 | 10/1984 | Fieldhouse | 428/506 |
| 4,480,065 | 10/1984 | Kawai et al. | 524/418 |
| 4,514,442 | 4/1985 | Crepeau | 427/140 |
| 4,537,825 | 8/1985 | Yardley | 428/327 |
| 4,599,258 | 7/1986 | Hageman | 428/140 |
| 4,601,935 | 7/1986 | Metcalf et al. | 428/57 |
| 4,687,810 | 8/1987 | Coran | 525/74 |
| 4,732,925 | 3/1988 | Davis | 524/426 |
| 4,742,119 | 3/1988 | Close | 525/211 |
| 4,767,658 | 8/1988 | Lorenz | 428/192 |
| 4,778,852 | 10/1988 | Futamura | 525/97 |
| 4,801,639 | 1/1989 | Hoshi et al. | 524/112 |
| 4,803,020 | 2/1989 | Valaitis et al. | 264/22 |
| 4,833,194 | 5/1989 | Kuan et al. | 524/525 |
| 4,839,412 | 6/1989 | Harrell et al. | 524/436 |
| 4,845,145 | 7/1989 | Hazelton et al. | 524/426 |
| 4,851,463 | 7/1989 | Opsahl et al. | 524/109 |
| 4,855,362 | 8/1989 | Muse, Jr. et al. | 525/194 |
| 4,894,408 | 1/1990 | Hazelton et al. | 524/425 |
| 4,897,137 | 1/1990 | Miller et al. | 156/157 |
| 4,912,148 | 3/1990 | Kim et al. | 524/487 |
| 4,918,127 | 4/1990 | Adur et al. | 524/415 |
| 4,944,818 | 7/1990 | Dybsky et al. | 156/71 |
| 4,985,502 | 1/1991 | Izumi et al. | 525/194 |
| 4,990,568 | 2/1991 | Benefield et al. | 525/232 |
| 4,994,328 | 2/1991 | Cogliano | 428/489 |
| 5,051,477 | 9/1991 | Yu et al. | 525/194 |
| 5,070,111 | 12/1991 | Dumbauld | 521/82 |
| 5,073,597 | 12/1991 | Puydak et al. | 525/193 |
| 5,084,119 | 1/1992 | Barksdale | 156/157 |
| 5,086,121 | 2/1992 | Hazelton et al. | 525/197 |
| 5,126,384 | 6/1992 | Davis et al. | 524/71 |
| 5,130,355 | 7/1992 | Hergenrother et al. | 524/71 |
| 5,206,305 | 4/1993 | Tojo et al. | 525/331.7 |

FOREIGN PATENT DOCUMENTS

| | | | |
|---|---|---|---|
| 0484872A3 | 11/1991 | European Pat. Off. | C08J 3/24 |
| 2310379 | 4/1976 | France | C08L 23/10 |

OTHER PUBLICATIONS

UL 790 — *Standard for Tests For Fire Resistance of Roof Covering Materials*, Fifth Edition, Underwriters Laboratories Inc., (Oct. 1983), pp. 1–20.

"Minimum Requirements for Non-Reinforced Black EPDM Rubber Sheets for Use in Roofing Applications", American National Standard, The RMA Roofing Products Division, (1990).

"Rubber, vulcanized — Determination of tear strength (trouser, angle and crescent test pieces)", First Edition, International Standard (1979).

"Rubber–Thermoplastic Compositions. Part V. Selecting Polymers for Thermoplastic Vulcanizates*" by Coran et al., *Rubber Chem. Technol.*, vol. 55, pp. 116–136 (undated).

*Primary Examiner*—Patrick J. Ryan
*Assistant Examiner*—Abraham Bahta
*Attorney, Agent, or Firm*—Frank J. Troy, Sr.

[57] ABSTRACT

Vulcanizable elastomeric roof sheet materials for roofing having improved burn resistivity and prepared from a polymeric composition of matter comprise at least one polymer selected from the group consisting of polyolefins prepared from monomers containing at least two carbon atoms and mixtures thereof, the polymer having a crystallinity of up to about 2 percent by weight; about 20 to 125 parts by weight of one or more non-black mineral fillers per 100 parts of the polymer, about 50 to 110 parts by weight of one or more black-type fillers per 100 parts of the polymer; and from about 50 to 70 parts by weight of a processing material or softener per 100 parts of the polymer. A method of covering a roof comprises the steps of applying sheets of vulcanizable elastomeric roof sheet material prepared from a vulcanizable polymeric composition of matter, to the roof being covered; overlapping adjacent edges of the roof sheet material; and adhesively seaming the overlapped layers of the roof sheet material together to form a continuous elastomeric roofing membrane. The composition of matter is devoid of any flame retardant rubber chemical additives, heavy metals and halogen-containing polymers and possess improved burn resistivity.

23 Claims, No Drawings

EPDM ROOFING MEMBRANE WITH IMPROVED BURN RESISTIVITY

TECHNICAL FIELD

The present invention relates generally to sheeting material used for roofing. More particularly, the present invention relates to heat seamable sheeting material which exhibits improved burn resistivity. Specifically, the sheeting material comprises mineral fillers such as soft and hard clays, chemically modified clays, calcium carbonate, titanium dioxide, silicon dioxide and the like and elastomers such as ethylene-propylene-diene terpolymer, referred to herein as EPDM, ethylene-propylene rubber, referred to herein as EPM, ethylene-butene copolymer or similar olefinic-type polymers, and mixtures thereof. The elastomers are amorphous rather than crystalline or semi-crystalline, however, blends of amorphous and semi-crystalline polymers may have utility in this invention. A method is also provided for covering the roofs of buildings which includes the step of employing the sheeting material of the present invention.

BACKGROUND OF THE INVENTION

Ethylene-propylene copolymers (EPM) and ethylene-propylene-diene terpolymers (EPDM) are extensively utilized in a variety of applications. A particular application wherein EPM and EPDM are preferred because of their excellent physical properties, weathering and heat aging resistance, is in rubber sheeting, such as roofing, agricultural pond liners and water distribution membranes. EPM and EPDM sheeting materials usually are prepared by compounding the EPM, EPDM or mixtures thereof with the appropriate fillers, plasticizers, antidegradants, etc. in a suitable internal mixer, and calendering the resulting compound into the desired sheet rubber.

Because of outstanding weathering resistance and flexibility, cured elastomeric roof sheeting has been rapidly gaining acceptance. This material normally is prepared by vulcanizing the composition in the presence of sulfur or sulfur containing compounds such as mercaptans. Our earlier U.S. Pat. No. 4,803,020 also teaches the use of radiation crosslinking promoters in an EPDM sheeting composition which can be cured by ionizing radiation. Vulcanization and curing can be done in the presence of other compounds as well. For example, ethylene-butene copolymers may be cured in the presence of a triazine or organic peroxide.

Notwithstanding the usefulness of radiation curing, sulfur curing, and triazine curing, a disadvantage of utilizing these elastomers is the lack of adhesion of these elastomers, especially cured olefinic elastomers to themselves. This is a serious problem because in applying elastomeric sheets to a roof, it is usually necessary to splice the cured elastomeric sheets together. This splice or seam area is subjected to both short-term and long-term stresses such as those caused by roof movement, heavy winds, freeze-thaw cycling and thermal cycling. Such stresses may manifest themselves in shear forces or peel forces, i.e., the seam peels back under severe stress conditions or results in a partially open seam (often referred to as a fish-mouth condition) under less severe conditions. Suffice to say, it is necessary that the adhesion of the roofing membrane to itself be considered in order to develop good seams.

Notwithstanding the problem of adhesion, the elastomeric roof sheeting materials also lack flame and burn resistivity. In order to improve flame resistivity of the product using the olefinic elastomers, fillers such as antimony trioxide, decabromo diphenyl oxide (DBDPO), dechlorane (chlorinated alicyclic hydrocarbon) alumina trihydrate, and chlorinated or brominated paraffins, are normally incorporated into the composition as shown in U.S. Pat. Nos. 4,839,419 and 4,851,463. However, the capacity of these membranes to accept these flame retardant fillers is somewhat limited, especially with membranes which exhibit thermoplastic characteristics.

Furthermore, U.S. Pat. No. 4,801,639 relates to flame retardant olefinic resin compositions which comprise a mixed resin of olefin and a silane-grafted polymer, a hydrated metal compound and a dicarboxylic acid or dicarboxylic acid anhydride derivative.

Therefore, while the use of flame retardant additives offer effective means of increasing flame resistivity, if the use of flame retardant additive could be reduced or eliminated, the additional labor and material costs and related hardware necessary to incorporate the additive would effect a significant cost savings. Moreover, elimination of the need to employ more expensive crystalline and semi-crystalline elastomers would also be advantageous. Also, a need for elastomeric roofing material with improved burn resistivity without sacrifice of seam strength continues to exist.

SUMMARY OF THE INVENTION

It is thus an object of the present invention to provide vulcanizable elastomeric roof sheeting materials that possess improved burn resistivity.

It is another object of the present invention to provide vulcanizable elastomeric roof sheeting materials that are environmentally friendly in that they do not contain any oxidants, heavy metals or halogen-containing rubber chemical additives for imparting burn resistivity.

It is yet another object of the present invention to provide vulcanizable elastomeric roof sheeting materials that possess improved burn resistivity in low slope uses.

It is still another object of the present invention to provide vulcanizable elastomeric roof sheeting materials that exhibit superior long-term heat aging, ozone and weathering resistance.

It is yet another object of the present invention co provide vulcanizable elastomeric roof sheeting materials that possess improved dimensional stability.

It is still another object of the present invention co provide vulcanizable elastomeric roof sheeting materials from uncured membrane compounds that possesses Mooney viscosities of 34 to 40 Mooney units at 135° C.

It is yet another object of the present invention to provide vulcanizable elastomeric roof sheeting materials that possess unaged and heat aged physical properties that exceed the requirements of the RMA for unreinforced black EPDM membranes used in roofing applications.

It is still another object of the present invention to provide a method for covering roofs which employs vulcanizable elastomeric roof sheeting materials possessing improved burn resistivity in low slope uses.

In general the present invention relates to vulcanizable elastomeric roof sheet materials for roofing having improved burn resistivity and prepared from a vulcanizable polymeric composition of matter comprising at least one polymer selected from the group consisting of polyolefins prepared from monomers containing at least 2 carbon atoms and mixtures thereof; about 20 to 125 parts by weight of one or more non-black mineral fillers per 100 parts of the polymer;

about 50 to 110 parts by weight of one or more black-type fillers per 100 parts of said polymer; and from about 50 to 70 parts by weight of a processing material, per 100 parts of the polymer, the composition of matter being devoid of flame retardant rubber chemical additives, heavy metals and halogen-containing polymers.

A method for covering a roof is also provided and comprises the steps of applying sheets of a vulcanizable elastomeric roof sheet material prepared from a polymeric composition of matter to the roof being covered; overlapping adjacent edges of the roof sheet material; and adhesively seaming the overlapped edges of the roof sheet material together to form a continuous vulcanized elastomeric roofing membrane, the composition of matter being devoid of flame retardant rubber chemical additives, heavy metals and halogen-containing polymers and possessing improved burn resistivity.

At least one or more of the foregoing objects which shall become apparent to those skilled in the art are described in greater detail with reference to the specification which follows.

PREFERRED EMBODIMENT OF THE INVENTION

As noted hereinabove, the roof sheeting materials of the present invention comprise EPDM and EPM. The term EPDM is used in the sense of its definition as found in ASTM-D-1418-85 and is intended to mean a terpolymer of ethylene, propylene and a diene monomer with the residual unsaturation portion of the diene in the side chain. Illustrative methods for preparing such terpolymers are found in U.S. Pat. No. 3,280,082 and British Pat. No. 1,030,289, the disclosures of which are incorporated herein by reference. The preferred polymers having from about 55 to about 70 weight percent ethylene and from about zero to about 12 weight percent diene with the balance of the polymer being propylene or some other similar olefin-type polymer. Also, the polymers are amorphous which results from having a crystallinity of from zero up to about two percent by weight. Accordingly, crystalline and semi-crystalline EPDM and EPM polymers are not required for practice of the present invention, however, blends of amorphous and semi-crystalline EPDM and EPM may be used to practice this invention, provided the resulting blend of polymers has not more than about 2 percent by weight crystallinity.

Semi-crystalline and crystalline EPDM and EPM materials are generally defined as those having at least two percent crystallinity and higher, up to about 13 percent by weight, as is known in the art. Where these materials have higher crystallinity than the amorphous EPDM and EPM materials, it is within the present invention to utilize blends with the amorphous materials. Relative amounts of the amorphous and crystalline materials can be varied although the amorphous component will comprise the majority, that is, usually at least 80 percent by weight of the 100 percent amount of EPDM or EPM material. When blends are employed, they should be compounded in relative amounts taking into account their crystallinity in order that the EPDM and/or EPM blend has a crystallinity of less than or up to about two percent by weight, in keeping with the preferred use of amorphous polymer materials.

To be useful in such blends, according to the present invention, the EPDM will have at least about 2 weight percent crystallinity, from the ethylene component; an $\overline{Mn}$ as measured by GPC of at least about 30,000 and an $\overline{Mw}$, as measured by GPC of at least about 100,000. Similarly, the EPR should have at least about 2 weight percent crystallinity (ethylene); an $\overline{Mn}$, as measured by GPC of at least about 30,000 and an $\overline{Mw}$, as measured by GPC of at least about 100,000.

The diene monomer utilized in forming the EPDM terpolymer is preferably a non-conjugated diene. Illustrative examples of non-conjugated dienes which may be employed are dicyclopentadiene; alkyldicyclopentadiene; 1,4-pentadiene; 4-hexadiene; 1,5-hexadiene; 1,4-heptadiene; 2-methyl-1,5-hexadiene; cyclooctadiene; 1,4-octadiene; 1,7-octadiene; 5-ethylidene-2-norbornene; 5-n-propylidene-2-norbornene; 5-(2-methyl-2-butenyl)-2-norbornene and the like. A typical EPDM is Royalene® 3180 having a Mooney Viscosity (ML/$_4$ at 125° C.) of about 63; an ethylene content of about 65 weight percent and about 2 to 2.5 weight percent of third monomer (5-ethylidene-2-norbornene) with the balance of the terpolymer being propylene. Royalene® 3180 is a standard, amorphous EPDM terpolymer having less than two weight percent crystallinity and having a Mooney Viscosity (ML/$_4$ at 125° C.) of about 62–63.

In order to aid calendering, low Mooney EPDM terpolymers can be blended with Royalene® 3180 to reduce the overall viscosity of the fully compounded membrane compound. Suitable low Mooney polymers include: Royalene® 521, having a Mooney Viscosity (ML/$_4$ at 125° C.) of about 29–30, a ethylene content of about 51 weight percent, about 5 weight percent unsaturation and essentially no crystallinity; another preferred EPDM terpolymer is Royalene® 501 which has a Mooney Viscosity (ML/$_4$ at 125° C.) of about 30–31, an ethylene content of about 57 weight percent, and essentially no crystallinity, about 4.1 weight percent unsaturation and essentially no crystallinity. Other EPDM terpolymers commercially available from DSM Copolymer include Keltan® 2308, having a Mooney Viscosity (ML/$_4$ at 125° C.) of about 32, about 2.7 weight percent unsaturation and about 8.2 weight percent crystallinity, as well as Keltan® DE-296, having a Mooney Viscosity (ML/$_4$ at 125° C.) of about 50–51, an ethylene content of about 63 weight percent, about 2.7 weight percent unsaturation and about 0.7 weight percent crystallinity.

Preferred practice of the present invention is with fully compounded compositions having a viscosity of about 36 to 39 (ML/$_4$ at 125° C.). Accordingly, if the elastomer does not possess inherent low viscosity, it can be blended with low Mooney elastomers which are known to those skilled in the art and within the scope of the present invention. Where the viscosity is satisfactory for processing, no blending is required, but may be employed for other reasons such as cost, availability, physical properties and the like. For purposes of illustration, non-limiting blends include for example, about 57 parts by weight of Royalene® 3180 and 43 parts by weight of Royalene® 501; or about 85 parts by weight of Royalene® 3180 and 15 parts by weight of Keltan® 2308; or about 25 parts by weight of Royalene® 501 and 75 parts by weight of Keltan® DE-296; to total 100 parts by weight of elastomer.

The term EPM is used in the sense of its definition as found in ASTM D-1418-85 and is intended to mean a copolymer of ethylene and propylene. The preferred copolymers contain from about 55 to 70 weight percent ethylene with the balance to total 100 weight percent being propylene. As noted hereinabove, it is within the scope of the present invention to blend major amounts of low Mooney EPDM terpolymers with minor amounts of high Mooney EPDM terpolymers to reduce the overall viscosity of the membrane compound.

Also, useful as a roofing material in the present invention is a copolymer of ethylene and butene. This particular copolymer has about 82 weight percent ethylene with the balance to total 100 weight percent being butene. A typical ethylene/butene copolymer is GERS-1085 (Union Carbide Corporation) having a $\overline{M}w$, as measured by GPC of at least about 221,000. Other similar olefinic polymers (e.g., ethylene/octene copolymer) can be used to practice this invention. For purposes of discussion herein, references to polymers is intended to include any of the EPDM, EPM or similar olefinic polymers of the present invention. As noted hereinabove, it is within the scope of the present invention also to blend low Mooney EPDM terpolymers with the olefinic polymers disclosed herein to reduce the overall viscosity of the membrane compound.

The composition or compound employed to form the roof sheeting material comprises 100 parts by weight of EPDM, EPM, or other similar olefinic type copolymers, including mixtures thereof, to which are added mineral fillers as a partial replacement for traditionally used carbon black fillers, and processing materials as well as optionally other components, all of which are discussed hereinbelow.

With respect first to the mineral fillers, suitable fillers are selected from the group comprising of hard clays, soft clays, chemically modified clays, mica, talc, alumina trihydrates, calcium carbonate, titanium dioxide, amorphous precipitated hydrated silica and mixtures thereof. These fillers may partially replace "black" fillers, i.e. carbon black and other related petroleum-derived materials.

Some four basic types of clays are normally used as reinforcing fillers for rubber elastomers. The different types of clay fillers include; airfloated, water washed, calcined and surface treated or chemically modified.

The airfloated clays are the least expensive and most widely used. They are divided into two general groups, hard and soft, and offer a wide range of reinforcement and loading possibilities. Hard Clays are used in the amount of about 25 parts to about 125 parts per 100 parts of polymer(phr) by weight, preferably in an amount from about 25 to 110 phr. In order to maintain equivalent compound hardness, 1.5 to 1.75 phr hard clay is used to replace 1 phr of carbon black in preparing sulfur cured EPDM roof sheeting. Any commercially available hard clay may be used. The preferred airfloated hard clays used are: Suprex®, Barden R®; LGB® all commercially available from J. M. Huber Corporation.

The airfloated soft clays are used in the amount of about 25 parts to about 125 parts per 100 parts of polymer(phr), preferably in an amount of about 65 phr. Again, in order to maintain equivalent compound hardness, 1.5 to 1.75 phr soft clay is used to replace 1 phr of carbon black in preparing sulfur cured EPDM roof sheeting. The preferred airfloated soft clays used are Paragons®; and K-78® commercially available from J. M. Huber Corporation and Hi-White R® clay from Evans clay.

Water washed clays are normally considered as semi-reinforcing fillers. This particular class of clays are more closely controlled for particle size by the water-fractionation process. This process permits the production of clays within controlled particle size ranges. The preferred ranges of water washed clays are very similar to the preferred amounts of airfloated soft clays mentioned hereinabove. Some of the preferred water washed clays include Polyfil® DL, Polyfil® F, Polyfil® FB, Polyfil® HG-90, Polyfil® K and Polyfil® XB, all are commercially available from J. M. Huber Corporation.

The third type of clay includes the calcined clay. Clays normally contain approximately 14 percent water of hydration, and most of this can be removed by calcination. The amount of bound water removed determines the degree of calcination. The preferred ranges of calcined clays are very similar to the preferred amounts of airfloated hard clays mentioned hereinabove. Some of the preferred calcined clays include Polyfil® 40, Polyfil® 70, and Polyfil® 80, all commercially available from J. M. Huber Corporation.

The final type of clay includes the chemically modified reinforcing clays. Cross-linking ability is imparted to the clay by modifying the surface of the individual particles with a polyfunctional silane coupling agent. Chemically modified clays are used in the amount of about 25 parts to about 110 parts per 100 parts of polymer(phr), preferably in an amount from of about 65. in an effort to achieve equivalent compound hardness, about 1.5 phr of chemically modified clay is used to replace 1 phr carbon black in preparing sulfur cured EPDM roof sheeting. Normally the specific gravity of most clays is about 2.60 at 25° C. The preferred chemically modified clays are commercially available from J. M. Huber Corporation and include: Nucap® 100, Nucap® 200, Nucap® 190, Nucap®290, Nulok®321, Nulok®390 and Polyfil® 368.

Other useful non-black fillers include amorphous silica (silicon dioxide). Silicas are generally classed as wet-process, hydrated silicas because they are produced by a chemical reaction in water, from which they are precipitated as ultrafine, spherical particles. Silica can be employed in the amount of about 20 parts to about 75 parts per 100 parts of polymer(phr), preferably in an amount from about 20 to 50 phr. The useful upper range is limited by the high viscosity imparted by fillers of this type. Some of the commercially available silicas which may be used include: Hi-Sil® 215, Hi-Sil® 233, Hi-Sil® EP and Silene® D all produced by PPG Industries. Also, a number of useful commercial grades of different silicas are available from J. M. Huber Corporation.

Finely ground calcium carbonate is employed in the amount of about parts to about 200 parts per 100 parts of polymer(phr), preferably in an amount from about 35 to 125 phr. ! n order to maintain equivalent compound hardness the replacement ratio for calcium carbonate to carbon black is about 2:1. Calcium carbonate generally has a specific gravity of about 2.71 and is commercially available from a number of suppliers including Harwick Chemical, J. M. Huber Corporation, Georgia Marble, Genstar Stone Products and Omya, Inc.

Titanium dioxide is employed in the amount of about 5 parts to about 100 parts per 100 parts of polymer(phr), preferably in an amount from about 10 to 60 phr. Both the rutile and anatase form of titanium dioxide may be used, however, the rutile form is preferred and includes such products as TiPure® R-960, which is a fine, white powder having a specific gravity of 3.90 and commercially available from DuPont Co.

Other commercially available non-black mineral fillers that may be employed to practice this invention includes talc (magnesium silicate), mica (mixtures of sodium and potassium aluminum silicate) and alumina trihydrate. Alumina trihydrate can also be used as a flame retardant and smoke suppressant in vulcanizable EPDM roof sheeting.

Other suitable fillers are selected from the group consisting of reinforcing materials, and mixtures thereof, as are customarily added to rubber. Examples include such materials as carbon black, ground coal, cryogenically ground rubber and the like. Generally, preferred fillers include carbon black, ground coal and cryogenically ground rubber.

Carbon black is used in an amount of about 20 parts to about 150 parts per 100 parts of polymer (phr), preferably in an amount of about 50 to about 110 phr. The preferred range of carbon black herein (50 to 110 phr) is about equal to the amount of carbon black normally used in preparing sulfur cured EPDM roof sheeting. The carbon black useful herein is any carbon black. Preferred are furnace blacks such as GPF (general-purpose furnace), FEF (fast-extrusion furnace) and SRF (semi-reinforcing furnace).

The ground coal employed as a filler in the compositions of the invention is a dry, finely divided black powder derived from a low volatile bituminous coal. The ground coal has a particle size ranging from a minimum of 0.26 microns to a maximum of 2.55 microns with the average particle size of 0.69±0.46 as determined on 50 particles using Transmission Electron Microscopy. The ground coal produces an aqueous slurry having a pH of about 7.0 when tested in accordance with ASTM D-1512. A preferred ground coal of this type is designated Austin Black which has a specific gravity of about 1.30±0.03, an ash content of 4.80% and a sulfur content of 0.75%. Austin Black is commercially available from Coal Fillers, Inc., P.O. Box 1063, Bluefield, Va. Amounts range from about 10 to 35 phr with about 10 to 20 being preferred. Use of ground coal is optional and an attendant reduction in the amount of carbon black can be made to compensate.

Finally, essentially any cryogenically ground rubber may be employed as a filler in the composition of the invention. The preferred cryogenically ground rubbers are cryogenically ground EPDM, butyl, neoprene and the like. A preferred cryogenically ground rubber is a cryogenically ground EPDM rubber. The preferred cryogenically ground EPDM rubber is a fine black rubbery powder having a specific gravity of about 1.129±0.015 and a particle size ranging from about 30 to about 300 microns with an average particle size ranging from about 50 to about 80 microns. Amounts may range from about 5 to 40 phr with about 10 to 25 being preferred.

Mixtures of Austin black and cryogenically ground rubber useful herein may be utilized as a partial replacement for carbon black. Where mixtures of these two fillers are employed the relative amounts thereof can be widely varied; the overall total not exceeding about 60 phr. The ratio of Austin black to cryogenically ground rubber may range from a desired ratio of 2:1 to perhaps even a ratio of 3:1. Again, as noted hereinabove, other filler materials can be employed. Amounts thereof fall within the range of amounts normally employed in preparing sulfur cured conventional EPDM roof sheeting.

With respect to the processing oil, it is included to improve the processing behavior of the composition (i.e. reduce mixing time and increase calendering rate). The processing oil is included in an amount ranging from about 20 parts to about 105 parts by weight of process oil per 100 parts of elastomer component, preferably in an amount ranging from about 50 parts to about 70 parts by weight. Preferred processing oils are a paraffinic oil, e.g. Sunpar 2280 which is available from the Sun Oil Company. Other petroleum derived oils including naphthenic oils may be used.

Curing of the EPDM membrane compounds when used in the compositions of the invention can be effected by any of the well known curing systems, including sulfur and sulfur-donor cure systems, peroxide cure systems, and quinone-type cure systems. Curing of the EPM rubbers, when used in the compositions of this invention, can generally be effected with a peroxide cure system.

Sulfur and sulfur-containing cure systems which can be used in the practice of this invention include those containing elemental sulfur along with any of the commonly used sulfur accelerators including: n-cyclohexyl-2-benzothiazole sulfenamide, 2-mercaptobenzothiazole, 2,2'-dibenzothiazyl disulfide, tetramethylthiuram disulfide, zinc dimethyldithiocarbamate, zinc dibutyldithiocarbamate, 4,4'-dithiodimorpholine, dipentamethylenethiuram hexasulfide, tetramethylthiuram monosulfide, ferric dimethyldithiocarbamate, zinc-O, O-dibucylphosphorodithioate, zinc diethyldithiocarbamate, and the like.

Sulfur donor-type accelerators may be used in place of elemental sulfur or in conjunction with elemental sulfur if desired. Suitable amounts of sulfur and/or sulfur donor-type compounds can be readily determined by those of ordinary skill in the art and generally range from about 1 to about 3 phr. The amounts of sulfur vulcanization accelerator can also be readily determined by those of ordinary skill in the art and generally range from about 2 to about 6 phr.

Examples of suitable peroxides that can be used as curing agents or co-curing agents include alpha-cumyl hydroperoxide, methylethylketone peroxide, hydrogen peroxide, acetylacetone peroxide, t-butyl hydroperoxide, t-butyl peroxybenzoate, 2,5-bis(t-butyl peroxy)-2,5-dimethylhexene, lauryl peroxide, benzoyl peroxide, 2,4-dichlorobenzoyl peroxide, dibenzoyl peroxide, bis(p-monomethylene-benzoyl) peroxide, bis(p-nitrobenzoyl) peroxide, phenylacetyl peroxide, and the like. Suitable amounts of peroxide crosslinking agents can be readily determined by those having ordinary skill in the art and generally range from about 1 to about 6 phr.

Examples of inorganic peroxides which can be used as co-curing agents with p-quinone dioxime include lead peroxide, zinc peroxide, barium peroxide, copper peroxide, potassium peroxide, silver peroxide, sodium peroxide, calcium peroxide, metallic peroxyborates, peroxychromates, peroxydicarbonates, peroxydiphosphates, peroxydisulfates, peroxygermanates, peroxymolybdates, peroxynitrates, magnesium peroxide, sodium pyrophosphate peroxide, and the like.

Examples of polysulfide activators for the quinone-type co-curing agents include calcium polysulfide, sodium polysulfide, as well as organic polysulfides having the general formula R—$(S)_x$—R, wherein R is a hydrocarbon group and x is a number from 2–4. Examples of organic polysulfides are disclosed in U.S. Pat. No. 2,619,481.

Conventional radiation equipment and techniques can also be employed in the practice of this invention. Suitable ionizing crosslinking promoters which can be used include: liquid high-vinyl 1,2-polybutadiene resins containing 90 percent 1,2-vinyl content; Sartomer SR-206 (ethylene glycol dimethacrylate), Di-Cup R(dicumyl peroxide, about 98 percent active), and Pental A (pentaerythritol resin prepared from tall oil). Preferably, these rubber chemical additives can be included in an amount of from about 1.5 to about 20 phr. Such rubber chemical additives should be compatible with the other ingredients in the composition and function to reduce the dosage of ionizing radiation needed to obtain the desired level of crosslinking.

The compositions of this invention can be compounded with various conventional additives as desired, including process and extender oils; processing aids such as zinc stearate, sodium dodecyl sulfate as well as tackifying resins, plasticizers, antioxidants, antiozonants, waxes, cure accelerators, zinc oxide, stearic acid, UV stabilizers and the like. Such additives can be utilized in amounts conventionally employed in such compounds.

The compositions of this invention can also be prepared by conventional means using conventional rubber compounding equipment such as a Brabender, Banbury, Sigma-blade mixer, two-roll mill, or other mixers suitable for forming viscous, relatively uniform admixtures. Mixing techniques depend on a variety of factors such as the specific types Of polymers used, and the fillers, processing oils waxes and other ingredients used. The ingredients can be added together in a single shot, loaded with the fillers, oils, etc. going in first and the polymer going in last, or in a more conventional manner with the polymer added first, depending on the actual ingredients used.

Mixing cycles generally range from about 3 to 6 minutes. Better mixing is generally attained by an incremental procedure in which the rubber and part of the fillers are added first with little or no oil, with the remaining fillers and oil being added in additional increments. Rapid mixing and good dispersion can also be achieved by adding part of the EPM or EPDM on top of the fillers, plasticizers, etc. This procedure can be further modified by withholding part of the oil which is then added incrementally.

The cure package (sulfur/accelerator) is typically added near the end of the mixing cycle and at lower temperatures to prevent premature curing of the EPDM composition. When utilizing a type B Banbury internal mixer, in a preferred mode, the dry or powdery materials such as the non-black mineral fillers (Le., untreated clay, treated clays, talc, mica, and the like) of the present invention are added first, followed by the liquid process oil and finally the polymer (this type of mixing can be referred to as an upside-down mixing technique), Two-stage mixing can be employed when better filler dispersion is desired. The rubbery composition can then be formed into a sheet via calendering. The compositions of the invention can also be formed into various types of articles using other techniques such as extrusion.

The resulting admixture is sheeted to thickness ranging from 5 to 200 mils, preferably from 35 to 60 mils by conventional sheeting methods, for example, milling, calendering or extrusion. Preferably, the admixture is sheeted to at least 40 mils (0.040-inches) which is the minimum thickness specified in manufacturing standards established by the Roofing Council of the Rubber Manufacturers Association (RMA) for non-reinforced EPDM rubber sheets for use in roofing applications. In many cases, the admixture is sheeted to a thickness of 40–45 mils, since this is the thickness for a large percentage of "single-ply" roofing membranes used commercially. The sheeting can be visually inspected and cut to the desired length and width dimensions after curing.

The method of the present invention is practiced by utilizing an elastomeric sheet material as described herein. As the sheet is unrolled over the roof substructure in an otherwise conventional fashion, the seams of adjacent sheet layers are overlapped. The width of the seam can vary depending on the requirements specified by the architect, building contractor or roofing contractor and thus, do not constitute a limitation of the present invention. Seams are joined with conventional adhesives such as, for instance, a butyl-based lap splice adhesive commercially available from Firestone Building Products Company as SA-1065. Application can be facilitated by spray, brush, swab or other means known in the art.

In order to demonstrate practice of the present invention, several elastomeric compounds according to the present invention were prepared and subjected to physical testing, as will now be set forth in detail. The elastomers selected have been characterized in TABLE I hereinbelow.

TABLE I

POLYMER CHARACTERIZATION STUDY

| Elastomer | Royalene ® | | | Keltan ® |
|---|---|---|---|---|
| | 3180 | 521 | 501 | 2308 |
| $ML_4$ at 125° C. | 63 | 29–30 | 30–31 | 32 |
| Ethylene weight % | 65 | 51 | 57 | 74 |
| Unsaturation, weight % | 2.2 | 5.0 | 4.1 | 3.3 |
| Crystallinity, weight % (by DSC) | 0.9 | 0.0 | 0.0 | 8.2 |
| Tg, °C. (by DSC) | −53.7 | −53.9 | −54.5 | −46.8 |
| Tm, °C. (by DSC) | 45.3 | none[a] | none[a] | 43.7 |
| Specific Gravity @ 23° C. | 0.87 | 0.87 | 0.87 | 0.87 |
| $\overline{M}n$ | 89,580 | — | — | 71,367 |
| $\overline{M}w$ | 221,061 | — | — | 131,953 |
| $\overline{M}n/\overline{M}w$ Ratio | 2.47 | — | — | 1.85 |

[a])Crystallinity is zero; accordingly no Tm.

The following examples in TABLE II represent low slope roofing membrane compositions with improved burn resistivity which are based upon EPDM terpolymers and are submitted for the purpose of further illustrating the nature of the present invention and are not to be considered as a limitation on the scope thereof. Parts of each ingredient are by weight, unless otherwise specified. Example No. 1 is a conventional sulfur cured black EPDM membrane of the prior art. Examples 2–6 include clay filler, to impart burn resistivity, with two or more black-type fillers and, Example No. 5 is a control, insofar as the EPDM component was 100 parts Royalene® 3180 and not blended with a lower Mooney EPDM terpolymer.

TABLE II

Low Slope EPDM Membrane Formulations

| Example No. | 1 | 2 | 3 | 4 | 5[a] | 6 |
|---|---|---|---|---|---|---|
| Royalene ® 3180 | 100 | 79.75 | 59.45 | 85.13 | 100 | 58.22 |
| Royalene ® 501 | — | 20.25 | 40.55 | — | — | 41.78 |
| Keltan ® 2308 | — | — | — | 14.87 | — | — |
| N-650 HiStr GPF Black | 66 | 58.7 | 58.7 | 58.7 | 58.7 | 91.07 |
| N-330 HAF Black | 20 | 18 | 18 | 18 | 18 | — |
| Coal Filler (Austin Black) | 14 | 13.5 | 13.5 | 13.5 | 13.5 | 13.93 |
| Talc | 40 | — | — | — | — | — |
| HiWhite R Clay | — | 65 | 65 | 65 | 65 | 65 |

TABLE II-continued

Low Slope EPDM Membrane Formulations

| Example No. | 1 | 2 | 3 | 4 | 5[a] | 6 |
|---|---|---|---|---|---|---|
| Sunpar 2280 process oil | 60 | 60 | 60 | 60 | 60 | 60 |
| Zinc oxide | 3 | 3 | 3 | 3 | 3 | 3 |
| Stearic acid | 1 | 1 | 1 | 1 | 1 | 1.25 |
| Sulfur | 0.90 | 0.85 | 0.85 | 0.85 | 0.85 | 0.85 |
| Cure package | 3.15 | 3.55 | 3.55 | 3.55 | 3.55 | 3.55 |
| Total | 308.05 | 323.6 | 323.6 | 323.6 | 323.6 | 338.65 |
| $ML/_4$ at 135° C. - Rubber Masterbatches | | | | | | |
| Mooney Units (MU) | 44.1–46.5 | 46.3–48.8 | 43.5–43.7 | 45.6–49.7 | 48.9–51.6 | 48.9–52.2 |

[a] Sulfur cured conventional black EPDM membrane - control compound

Physical testing data including stress-strain properties; die C tear resistance; trouser tear properties and specific gravity are provided in TABLE III hereinbelow.

high modulus compared to the other examples listed in TABLE III. Example No. 3 also had the lowest Mooney viscosity of the six examples provided in TABLE III. The

TABLE III

Unaged Physical Properties of Low Slope EPDM Membranes

| Example No. | 1 | 2 | 3 | 4 | 5[a] | 6 |
|---|---|---|---|---|---|---|
| Stress-Strain Properties at 23° C. - Slabs cured 30 minutes at 160° C. | | | | | | |
| Unaged | | | | | | |
| 100% Modulus, psi | 360 | 295 | 370 | 300 | 295 | 405 |
| 300% Modulus, psi | 725 | 610 | 820 | 605 | 620 | 885 |
| Tensile at break, psi | 1645 | 1245 | 1480 | 1190 | 1515 | 1421 |
| Elongation at break, % | 725 | 700 | 590 | 710 | 760 | 565 |
| Die C Tear Properties at 23° C. - Slabs cured 30 minutes at 160° C. | | | | | | |
| Unaged | | | | | | |
| Lbs./inch | 253 | 227 | 215 | 237 | 230 | 218 |
| Trouser Tear at 23° C. - Machine Direction - Slabs cured 30 minutes at 160° C. | | | | | | |
| Unaged | | | | | | |
| Lbs./inch | 222.5 | 173 | 152 | 172 | 155 | 111 |
| Type of Failure | L-shape tear | Hook tear | L-shape tear | L-shape tear | Hook tear | Hook tear |
| Trouser Tear at 23° C. - Cross Direction - Slabs cured 30 minutes at 160° C. | | | | | | |
| Unaged | | | | | | |
| Lbs./inch | 163 | 181 | 127 | 164 | 139 | 127 |
| Type of Failure | Hook tear | Hook tear | Hook tear | Hook tear | Hook tear | Hook tear |
| Specific Gravity (uncured) | 1.182 | 1.213 | 1.214 | 1.214 | 1.212 | 1.226 |

[a] Sulfur cured conventional black EPDM membrane - control compound

In the Examples illustrated in TABLE III, Example No. 1 provides an EPDM composition featuring 100% Royalene® 3180, a blend of three different black-type fillers and 40 phr talc which resulted in a Mooney Viscosity of 40.8, a tensile strength at break of 1645 psi: and a die C tear resistance at 23° C. of 253 lbs./inch. Example No. 1 had the highest tensile strength of the six membrane compounds listed in TABLE III. Example No. 2, which featured a blend of Royalene® 3180 and Royalene® 501 was similar to Example No. 1, except 65 phr of untreated clay (HiWhite R clay) was used to replace the 40 phr talc. Both stress strain properties and die C tear resistance exceeded the RMA requirement for non-reinforced black EPDM membrane used in roofing applications. A 60/40 Royalene® 3180/ Royalene® 501 blend was used to prepare Example No. 3. This EPDM composition which featured 65 phr untreated clay was characterized as having sufficient processing safety ($T_5$: 26.8 minutes), 1480 psi tensile strength and relative membrane compound used to prepare Example No. 4 contained a blend of Royalene® 3180 and Keltan® 2308, three black-type fillers and 65 phr untreated clay (HiWhite R clay). Example No. 4 was characterized as having good tear resistance compared to the other six examples provided in TABLE III. The tensile strength of Example No. 5 which was based on 100% Royalene® 3180 was 1515 psi and the die C tear properties met the tear value specified by RMA. Lastly, Example No. 6 developed the highest state of cure based on modulus data. The tear pattern (trouser tear test—0.5-inch precut) for the six EPDM membrane compounds was either of the hooked or L-shaped variety. In all six test situations, the amount of paraffinic process oil remained constant at 60 phr.

All testing involving stress-strain properties was carried out at 23° C. For testing purposes, dumbbell-shaped specimens were cut from individual 45 mil cured slabs (press cured 30 minutes at 160° C.) according to ASTM D-412 (Method A—dumbbell and straight specimens). Modulus, tensile strength at break and elongation at break measurements were obtained using a table model Instron® tester Model 4301, and the test results were calculated in accordance with ASTM D-412. All dumbbell test specimens were allowed to set for about 24 hours, following which testing was carried out at 23° C. Die C tear testing was conducted in accordance with ASTM D-624. Testing was again carried out at 23° C. Lastly, trouser tear testing was conducted at 23° C. in accordance with the International Standard Organization (ISO) 34 (first edition—1979-10-1).

In a preferred process, the type and amount of non-combustible material (i.e., untreated clay, talc, etc. ) as well as the amount of paraffinic process oil was selected to provide a product (i.e., cured EPDM sheeting) meeting tensile strength and elongation minimums as set forth by the Roofing Council of the Rubber Manufacturers Association for non-reinforced black EPDM rubber sheets for use in roofing applications, i.e., a tensile strength minimum of 1305 psi (ASTM Test Method D-412) and a die C tear minimum of 150 lbs./inch (ASTM Test Method D-624). Except for the tensile strength of Example No. 4, both tensile and elongation at break as well as the die C tear properties met the physical property requirements specified by RMA (Rubber Manufacturers Association) for non-reinforced vulcanized black EPDM rubber sheeting used in roofing applications.

Roofing materials prepared from the membrane compounds listed in TABLE II were subjected to Spread-of-Flame testing at Underwriter's Laboratory (UL-790) in a low slope environment, i.e., 0.5-inch in 12-inch slope over four inches of isocyanurate foam insulation on a mechanically attached 40-inch wide by eight-foot long deck. This is an industry standard test conducted over 10 minutes at 760° C.±10° C. with a wind velocity of 12 mph±0.5 mph. The deck is ignited and the Spread-of-Flame must be less than six feet in 10 minutes, along the roofing membrane. The roofing materials based on Example Nos. 1–6 passed the Spread-of-Flame burn test.

In conclusion, it should be clear from the foregoing examples and specification disclosure that the use of amorphous EPDM terpolymers or blends of amorphous and semi-crystalline EPDM terpolymers having a combined crystallinity of up to about 2 percent by weight can be used to prepare elastomeric roof sheet material with good seaming and physical properties as well as improved burn resistivity. Similarly, the sheet material is environmentally friendly in that it does not contain halogen-based or halogen-containing rubber chemical additives; nor, does it contain oxides of metals such as antimony, mercury, lead, manganese and the like. It is to be understood that the invention is not limited to the specific types of amorphous EPDM elastomers exemplified herein or by the disclosure of other typical olefinic elastomers provided herein, the examples having been provided merely to demonstrate the practice of the subject invention. Similarly, the invention is not necessarily limited to the particular fillers, processing material, and additives exemplified or the amounts thereof. Those skilled in the art may readily select other amorphous elastomers, or fillers, processing aids and the like according to the disclosure made hereinabove.

In view of the properties described above, the compositions of the present invention are valuable in the production of roofing membranes. Roofing membranes formed from the compositions of the present invention may be produced by any method conventionally used for producing roofing membranes from filled polymeric compositions. For example, the membranes may be formed by a conventional calendering technique. Roofing membranes formed from the compositions of the present invention may optionally be scrim reinforced.

Thus, it is believed that any of the variables disclosed herein can readily be determined and controlled without departing from the scope of the invention herein disclosed and described. Moreover, the scope of the invention shall include all modifications and variations that fall within the scope of the attached claims.

What is claimed is:

1. A vulcanizable elastomeric roof sheet material for roofing having improved burn resistivity and prepared from a polymeric composition of matter, devoid of flame retardant rubber chemical additives comprising:

at least one polymer selected from the group consisting of polyolefins prepared from monomers containing at least 2 carbon atoms and mixtures thereof, said polymer having a crystallinity of up to about 2 percent by weight;

about 20 to 125 parts by weight of one or more non-black mineral fillers per 100 parts of said polymer;

about 50 to 110 parts by weight of one or more black fillers per 100 parts of said polymer; and from about 50 to 70 parts by weight of a processing material, per 100 parts of said polymer said composition of matter being devoid of flame retardant rubber chemical additives, heavy metals and halogen-containing polymers.

2. A vulcanizable elastomeric roof sheet material, as set forth in claim 1, wherein said non-black mineral filler is selected from the group consisting of hard clays, soft clays, chemically modified clays, mica, talc, alumina trihydrate, calcium carbonate, titanium dioxide, amorphous precipitated hydrated silica and mixtures thereof.

3. A vulcanizable elastomeric roof sheet material, as set forth in claim 1, wherein said polymer further comprises a diene monomer component.

4. A vulcanizable elastomeric roof sheet material, as set forth in claim 3, wherein said polymer comprises EPDM.

5. A vulcanizable elastomeric roof sheet material, as set forth in claim 2, wherein said processing material is selected from the group consisting of paraffinic oils, naphthenic oils and waxes and mixtures thereof.

6. A vulcanizable elastomeric roof sheet material, as set forth in claim 5, wherein said mineral filler comprises about 65 parts by weight of a clay and said polymeric composition of matter includes about 60 parts by weight of processing oil.

7. A vulcanizable elastomeric roof sheet material, as set forth in claim 2, wherein said clay is chemically modified.

8. A vulcanizable elastomeric roof sheet material, as set forth in claim 2, wherein said clay is untreated.

9. A vulcanizable elastomeric roof sheet material, as set forth in claim 1, further comprising from about 10 to 35 parts by weight of ground coal filler per 100 parts of said polymer.

10. A vulcanizable elastomeric roof sheet material, as set forth in claim 1, further comprising at least one or more polymers forming a mixture with said at least one polymer wherein said one or more polymers forming said mixture are selected from the group consisting of polyolefins prepared from monomers containing at least 2 carbon atoms and have a crystallinity of from about 2 percent by weight to greater than about 2 percent by weight, blended in relative proportions so that the overall crystallinity of said polymer mixture is greater than zero and up to about 2 percent by weight.

11. A method for covering a roof comprising the steps of:

applying layers of vulcanizable elastomeric roof sheet material prepared from a mineral filled polymeric composition of matter to the roof being covered;

overlapping adjacent edges of said layers; and adhesively seaming the overlapped areas to form an acceptable seam, said composition of matter being devoid of flame retardant rubber chemical additives, heavy metals and halogen-containing polymers and possessing improved burn resistivity.

12. A method, as set forth in claim 11, wherein said mineral filled polymeric composition of matter comprises:

100 parts by weight of polymer selected from the group consisting of polyolefins prepared from monomers containing at least 2 carbon atoms and mixtures thereof, said polymer having a crystallinity of up to about 2 percent by weight and said polymer mixtures being blended so that the overall crystallinity thereof is up to about 2 percent by weight;

from about 50 to 70 parts by weight of one or more non-black mineral fillers per 100 parts of said polymer;

about 50 to 110 parts by weight of one or more black fillers per 100 parts of said polymer; and from about 50 to 70 parts by weight of a processing material, per 100 parts of said polymer.

13. A method, as set forth in claim 12, wherein said non-black mineral filler is selected from the group consisting of hard clays, soft clays, chemically modified clays, mica, talc, alumina trihydrate, calcium carbonate, titanium dioxide, amorphous precipitated hydrated silica and mixtures thereof.

14. A method, as set forth in claim 12, wherein said polymer further comprises a diene monomer component.

15. A method, as set forth in claim 14, wherein said polymer comprises EPDM.

16. A method, as set forth in claim 13, wherein said processing material is selected from the group consisting of paraffinic oils, naphthenic oils and waxes and mixtures thereof.

17. A method, as set forth in claim 16, wherein said filler comprises about 65 parts by weight of a clay and said polymeric composition of matter includes about 60 parts by weight of processing oil.

18. A method, as set forth in claim 13, wherein said clay is chemically modified.

19. A method, as set forth in claim 13, wherein said clay is untreated.

20. A method, as set forth in claim 12, wherein said polymeric composition of matter further comprises from about 10 to 35 parts by weight of ground coal filler per 100 parts of said polymer.

21. A method, as set forth in claim 12, wherein said mineral filled polymeric composition of matter further comprises at least one or more polymers forming a mixture with said at least one polymer wherein said one or more polymers forming said mixture are selected from the group consisting of polyolefins prepared from monomers containing at least 2 carbon atoms and have a crystallinity of from about 2 percent by weight to greater than about 2 percent by weight, blended in relative proportions so that the overall crystallinity of said polymer mixture is greater than zero and up to about 2 percent by weight.

22. A vulcanizable elastomeric roof sheet material, as set forth in claim 1, further comprising a cure system.

23. A vulcanizable elastomeric roof sheet material, as set forth in claim 22, wherein said cure system includes sulfur.

* * * * *